United States Patent [19]

King et al.

[11] Patent Number: 4,924,407
[45] Date of Patent: May 8, 1990

[54] HUMIDITY RESISTANT METER READING DEVICE

[75] Inventors: John A. King, Allen; Harley J. Staber, Lewisville, both of Tex.

[73] Assignee: Siecor Corporation, Hickory, N.C.

[21] Appl. No.: 232,214

[22] Filed: Aug. 15, 1988

[51] Int. Cl.$^5$ ............................................. G08C 19/10
[52] U.S. Cl. ................. 364/480; 340/870.37; 364/556
[58] Field of Search ............ 340/870.37, 870.02, 340/870.07, 365; 361/306, 278, 297; 364/480, 556; 324/60 R

[56] References Cited

U.S. PATENT DOCUMENTS

| | | | |
|---|---|---|---|
| 4,007,454 | 2/1977 | Cain et al. | 340/870.37 |
| 4,165,505 | 8/1979 | Cain et al. | 340/870.37 |
| 4,429,308 | 1/1984 | Shankle | 340/870.37 |
| 4,433,332 | 2/1984 | Wason | 340/870.37 |
| 4,477,860 | 10/1984 | Wason et al. | 340/870.37 |
| 4,556,844 | 12/1985 | Wason | 340/870.02 |
| 4,606,008 | 8/1986 | Wason | 340/870.37 |
| 4,743,902 | 5/1988 | Andermo | 340/870.37 |
| 4,779,094 | 10/1988 | Lee et al. | 340/870.37 |

OTHER PUBLICATIONS

Motorola Linear Integrated Circuits, prepared by Technical Info Center, Series C, Third Printing, 1979 (previous edition 1976).
IC Op-Amp Cookbook, by Walter C. Jung, Howard W. Sams & Co., Inc.
Microelectronics Digital & Analog Circuits & Systems, Jacob Millman, Ph.D., McGraw-Hill Book Company.

Primary Examiner—Kevin J. Teska
Attorney, Agent, or Firm—Roy B. Moffitt

[57] ABSTRACT

A humidity resistant device (24 and 78) for reading a meter having multiple dial faces and a rotatable meter hand (17–18) and axle (19) for each dial face that includes for each dial face (a) a plate (16) disposed between the dial face and the meter hand; (b) an array of spaced apart excitable electrodes (11-1 through 11-10) on one surface of the plate confronting the meter hand and defining an array about a center portion that includes the axle (19) of the rotatable meter hand; (c) a center electrode (12) in the center portion forming a part of a plate capacitor between each excitable electrode and the center electrode, the center electrode connected to and monitored by a receiver circuit (24), for sensing current amplitude through each such plate capacitor and spaced apart from the array of excitable electrodes and the axle (19) of the rotatable meter hand; (d) an A.C. voltage signal source (25) for placing a predetermined voltage signal on a pre-determined one of the excitable electrodes; and, (e) a D.C. reference voltage source (33) connected both to the center electrode (12), a transimpedance amplifier (44), and a guard (21), to maintain the center electrode (12) and guard (21) at essentially the same voltage. The guard (21) circumscribes and is spaced apart from both the center electrode (12) and the excitable electrodes (11-1 through 11-10) and electrically buffers the center electrode (12).

40 Claims, 7 Drawing Sheets $C = C1 + C2$ $C' = C1 + C2 + (C3 C4)/(C3 + C4)$ $C' = C1 + C2 + (C3 C4)/(C3 + C4)$ $C = C1 + C2$

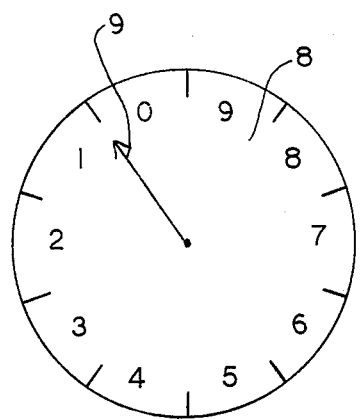
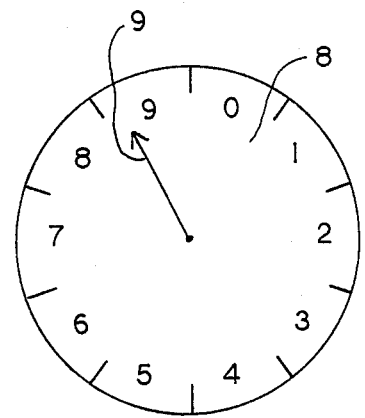
FIGURE 11                FIGURE 12
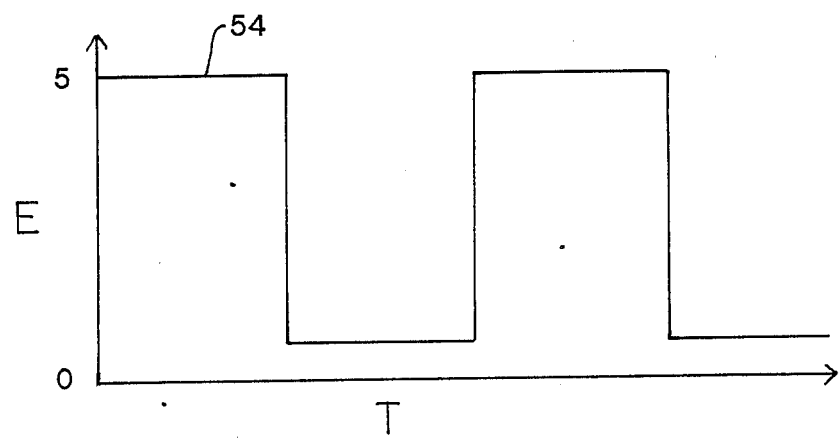
FIGURE 13

HUMIDITY RESISTANT METER READING DEVICE

TECHNICAL FIELD OF THE INVENTION

This invention relates to a humidity resistant apparatus for determining the orientation of objects such as a meter hand relative to a dial. More particularly, the invention is concerned with obtaining a current signal (amplitude) used to identify the position of a meter hand relative to a dial face, without significantly altering the interior structure or wiring of a meter.

BACKGROUND OF THE INVENTION

In general, this invention relates to the same field as the following U.S. Pat. Nos., which are herein incorporated by reference: 4,007,454, 4,165,505, 4,477,860, 4,606,008, 4,429,308, 4,433,332, 3,500,365, 3,845,377, 3,732,553, 3,068,456, 3,222,591, and 3,355,806. Application of the teachings of some of the aforementioned patents to practical manufacturing techniques is basically shown as element 1 in FIG. 1. In this Figure, PC board 2 is shown with glass insert 6 plus electronic circuits 4 deposited on its upper surface. Glass insert 6 represents a glass substrate onto which its under surface electrodes 5 (indium tin oxide for example) and center electrode 12 are deposited, in a manner taught by the above cited prior art. The glass is thought by the prior art to be necessary so that the meter hands 9 and dials 8, disposed beneath glass substrate 6, can be visually observed. Substrate 7 is spaced apart from substrate 2 by means of clips 3, which are described in U.S. Pat. No. 4,556,844, the contents which are incorporated by reference.

Substrate 7 schematically represents the face of a multi-dial meter on which there may be a plurality of dial faces 8. Only one dial face 8 is shown, but in practice, a plurality is contemplated. Each dial face has a rotatable member, hand 9 plus axle 19. The prior art teaches that dial hand 9 and axle 19 rotates in a rotating electric field created by electrodes 5. Elements 4 represent the electronic circuitry connected (not shown) to electrodes 5 and center electrode 12 necessary to detect, collect and transmit data caused by the presence of hand 9 in the rotating electric field created by electrodes 5 and a polyphase voltage continuously applied to electrodes 5, all as described by the prior art.

Glass plate 6 is affixed to printed circuit board by means of a conductive epoxy 10. After the composite of substrate 2 and glass plate 6 is made, the surface on which electrodes 5 and 12 are disposed should be coated with a plastic, otherwise there will be signal distortions believed to arise out of leakage between electrodes 5 and a center electrode 12 caused by water vapor at a relative humidity of 55% or more. Signal distortions can be either (i) erroneous reading, i.e., the meter reading device knows that its reading is bad and so indicates; or, (ii) a misreading, namely, a wrong number altogether, without acknowledgment by the device that the number is wrong. In order to protect against such distortion, the printed circuit board and glass substrate must be first washed with a solvent (trichlorethylene, for example) and then the surface coated by using a conformal sealer, such as Paraylene resin made by Union Carbide. It is essential that the solvent first must be used. If not, the coating will not properly adhere. However, when the solvent is used, the conductive epoxy 10 is dissolved or weakened, resulting in poor quality. If the solvent is not used and the printed circuit board and glass substrate are coated nonetheless, uneven adhesion of the coating results, yielding signal distortions. Applicants have found that with uncoated prior art devices, the higher the relative humidity the more the distortion, i.e., distortion appears to be proportional to the relative humidity. Coating is not necessarily believed to be a complete or a permanent solution itself because there are present indications that it merely slows the distortion process.

The prior art, exemplified by the above disclosed patents, employs a large (one megaohm) resistor 58 (FIG. 15) disposed on a printed circuit board (PCB) to cause a voltage drop. Small currents 57 are involved, thus a large resistor 58 is required to produce a usable signal. The glass substrate 6, upon which the excitable electrodes of the prior art are deposited, operates as a capacitor in combination with the electrodes 5 and 12. Glass capacitor 61, in combination with the above-mentioned large resistor 58, forms an RC circuit, a high impedance point at the juncture of the glass and the large resistor 59. In practice, this usually takes place at the interface of the glass and the PCB itself. A high impedance point and humidity do not mix. Signal distortion can result. Getting rid of the prior art glass plate 6, on which electrodes are deposited, is a first step towards the solution to the humidity problem and ease of manufacturing. Otherwise, the manufacturing problem of the glass plate first cleaned with a solvent and then a conformal coating placed thereover remains unsolved. A second step towards solution to the humidity problem is the employment of a low input impedance receiver circuit, such as that shown in FIG. 8, which minimizes variations due to humidity A third step is to maximize the signal contribution, due to the dial hand being in local proximity of the electrical field with respect to the signal size when the dial hand is not in local proximity thereto. Compare FIG. 5 with FIG. 6.

FIG. 15 is a simplified schematic description of prior art RC circuit created by the glass plate 6 acting as a capacitor (element 61) with resistor 58, (a one megaohm plus resistor) to create a necessary voltage drop so that a proper signal could be detected and transmitted by field effect transistor 56. The capacitance effect of element 61 arises out of center electrode 12, excitable electrodes 5 deposited on glass substrate 6 and electronic circuit 4 plus a polyphase voltage continuously supplied to electrodes 5 as taught by the prior art.

It would be desirable to have a meter reading device that would have no signal distortions at high humidity (55% RH and greater). Specifically, a desired meter reading device of this type would be fully operable and give substantially no distorted readings between 5 and 95% relative humidity (non-condensing) for an indefinite time between $-40°$ and $+70°$ C. Applicants have found a way to solve this relative humidity problem: placing excitable electrodes 11-1 through 11-10 (FIG. 14) and center electrode 12 between the dial face 8 and rotatable member (meterhand 9). See FIG. 16.

Such a structure, along with receiver circuit 24 as shown in FIG. 8, is used to measure the amplitude of a plurality of fields, one at a time, storing the measurements until all fields are read and then comparing such measurements to ascertain the location of a meterhand. In contrast, the prior art measures the resultant of a plurality of fields arising out of a polyphase voltage continuously applied to an array of excitable electrodes, stores and compares these resultants to certain preset values, to determine a voltage phase shift By following the teachings of this invention (1) there results a stronger signal to baseline ratio than achieved by the prior art, the baseline being the values read with the dial hand not in close proximity and the signal being the value read with the dial hand in close proximity to an excited electrode center electrode plate-like capacitor; (2) glass-electrode composite requirement is removed, which results in plastic (conformal) coating manufacturing simplicity, and (3) the receiver circuit of the invention employs a lower impedance than that taught by the prior art.

A device employing this invention has been observed to operate between 5 and 95% relative humidity for an indefinite time between −40° and +70° C. with substantially no distortion. A sealant and/or electronic guard can be used as insurance against signal distortion arising out of high humidity.

One structural difference between the invention and that of the previously identified prior art is that the placement of the guard, the excitable and center electrodes affixed to plate 16 in the space partially delimited by the circumferential path described by rotating dial hand 9 (rotatable member) and dial face 8. See elements 11-1 through 11-10, 12, and 21 of FIGS. 14 and 16. Another difference is that the center electrode 12 senses current amplitude, not a voltage change (shift in voltage phase), as does the prior art. When hand 9 is disposed over a given excited electrode, capacitance coupling is increased between the given electrode (any one of electrodes 11-1 through 11-10) and center electrode 12. This results in a greater current emitted by center electrode 12 than if the hand were absent. Since the position of a given excitable electrode is known, the presence of this "greater current" then identifies the position of the hand. Another difference is the elimination of a glass substrate in combination with excitable electrodes.

The prior art technique has drawbacks: (1) the glass-PCB-dial hand alignment is very critical and difficult to hold, (2) the glass has a propensity to contain large amounts of sodium, which at high humidities is very conductive. Soda lime silica glass is inexpensive thus it has a tendency to be used whereas specialty glasses that are devoid of, or low in, sodium are expensive and are not used, (3) the electrode pattern etching on the glass is expensive, (4) the epoxies used do not hold up to cleaning agents commonly used and without proper cleaning, the conformal coating will not adhere properly. The instant invention has the electrode pattern etched in the printed circuit board (PCB) along with the circuit interconnects using a standard process. Dial labeling information is reproduced on the PCB using standard soldermask and silkscreen techniques. Mounting of the PCB is below the dial hands and above the dial face itself. This new positioning of the PCB does the most to resolve the problems, which can occur at high humidity. Since the dial hands can be seen, it allows for the elimination of the glass and epoxy, which in turn allows for proper cleaning of the PCB. This in turn will promote good adhesion of the conformal coat, which will reduce the effects of humidity. The elimination of the glass and epoxy simplify the manufacturing process.

The prior art also uses a technique of forming a swirl pattern for the excitable electrodes (see U.S. Pat. No. 4,606,008 for example) so that they interlaced to promote the influence of the dial hand on the multiple excitable electrodes in combination with the center electrode. All of the excitable electrodes are continuously excited at the same time with a polyphase voltage to form a rotating electrical field. The resultant of this electrical field on the center electrode is measured. When the dial hand is introduced into the rotating electrical field, it causes a phase shift in the measured voltage as compared with no dial hand present, this being called a baseline and the measured value with dial hand present is a signal. The measurement is made by a high input impedance receiver circuit and the electrical field causes a voltage to be developed at the high input impedance.

The prior art technique described requires fine matching of the components involved. Also, measuring the resultant field requires initial calibration of the rotating electrical field, which is done with great difficulty by gluing a conductive "tweak dot" on the non-electrode side of the glass after adjusting the tweak dot so that it causes an acceptable measurement value with no dial hand present. Also, the signal to baseline ratio is very small because the dial hand influences only a small portion of the total electric field, which makes it difficult for easy measurement. The high input impedance of the receiver is also susceptible to influence by small leakage currents, appearing mostly in high humidity environments.

SUMMARY OF THE INVENTION

The invention is a humidity resistant device for reading meters having single or multiple dial faces and a rotatable member (meter hand and axle) for each dial face that includes for each dial (a) a plate positioned in between the dial face and the rotatable meter hand; (b) a plurality of spaced apart excitable electrodes on one surface of the plate confronting the meter hand and defining an array about a center portion that includes the axle of the rotatable meter hand and a center electrode; (c) a center electrode forming a part of a capacitor between it and any one of the excitable electrodes disposed in the center portion for sensing current amplitude through such capacitor, spaced apart from the axle of the rotatable meter hand and plurality of spaced apart excitable electrodes; (d) an A.C. voltage signal source for placing a predetermined voltage on a predetermined one of the plurality of excitable electrodes; and, (e) a D.C. reference voltage source connected to a transimpedance amplifier, to a guard, and to the center electrode. The guard includes a ring-shaped conductive strip on the same surface where the excitable and center electrodes are disposed and at least partially circumscribes the center electrode. The guard is also spaced apart from both center electrode and the excitable electrodes and electrically connected to the D.C. reference voltage source and a transimpedance amplifier for the purpose of maintaining the guard and center electrodes at essentially the same voltage. A receiver circuit is in electrical communication with the center electrode to convert the current amplitude sensed by the center electrode into a usable signal. By maintaining the center electrode at the same potential as the second voltage source, it is electrically isolated, typically known as buffered.

The excitable electrodes of the instant invention are patterned in a fashion so as to maximize the effect of the dial hand position and to influence only one excitable electrode/center electrode combination at a time. No rotating field. A coupling value from each individual excitable electrode to the center electrode without the dial hand being over the excitable electrode is known. This is called the coupling baseline. With the dial hand over the excitable electrode, the coupling is increased and this is called the coupling signal. The center electrode is connected to a low input impedance receiver, (part of a receiver circuit), which is used to make a measurement. The coupled electrical field causes a current to be developed at the low input impedance. Once an excitable electrode is excited, a measurement is taken and such is repeated in succession for all the excitable electrodes in any order desired. Each measurement is then compared to find the largest value. Since the excitable electrodes are fairly well equalized and positioned to lie within a unique arc, then the dial hand must be within the arc with the largest measured value.

Because of the pattern arrangement and singular fields measurements, the instant invention has the advantage of having the dial hand influence a much larger portion of the electrical field influencing the center electrode. This results in a larger signal to baseline ratio, easier to detect and is less sensitive to noise, greatly reducing the problem caused by high humidity. Most device and alignment tolerances also can be relaxed, easing manufacturing problems. Furthermore, the low input impedance of the receiver circuit is less susceptible to leakage currents, which can occur in a high humidity environment.

The instant invention also contemplates dial hands having a highly conductive portion facing the electrodes, resulting in a larger coupling and a greater signal to baseline ratio. This adds to the performance of the instant invention. A guard band also may be positioned between all excitable electrodes and the center electrode, the guard being buffered to the same voltage potential; yet, isolated from the center electrode itself. This arrangement allows any leakage currents developing between the excitable electrodes and the guard band due to the excitation voltage to be returned through the guard band. Since no voltage potential exists between the guard band the center electrode, no leakage currents can develop to influence the receiver circuit. This insures the elimination of noise due to humidity.

BRIEF DESCRIPTION OF THE DRAWINGS

FIGS. 11 and 12 are schematic plan views of one of the type of meter dials and rotatable meter hands that may be "read" by the instant invention.

FIG. 13 is a graphical representation of an example of square wave voltage applicable to excitable electrodes surrounding a center electrode.

DETAILED DESCRIPTION OF THE INVENTION/BEST MODE FOR CARRYING OUT THE INVENTION

Figure 1:
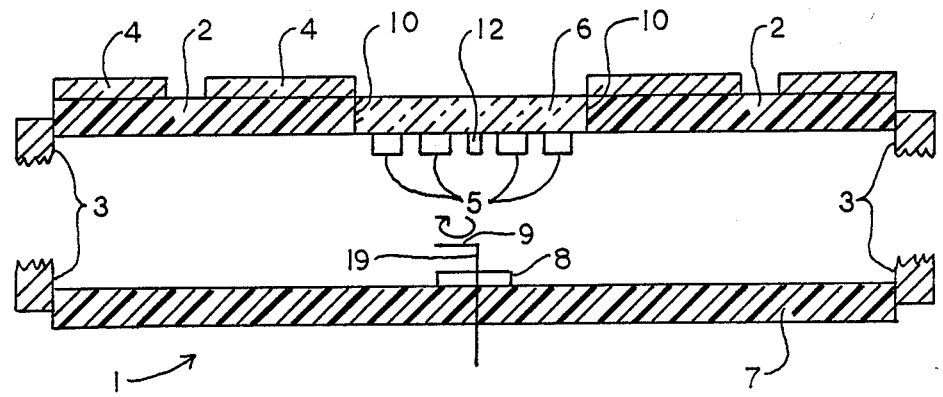
FIG. 1 is a schematic representation of a cross section of a prior art type meter reading device.

Denoted by element 1 of FIG. 1 is a cross sectional schematic representation of a prior art meter reading device referred to in the earlier part of this specification. This prior art device employs a printed circuit board 2, made of any conventional plastic, onto which there is deposited various and sundry electronic components 4 and leads (not shown) therefor. Critical to PCB 2 is one or more arrays (one for each dial) of electrodes 5 and center electrode 12, such as that described in U.S. Pat. Nos. 4,429,308, 4,477,860, and 4,007,454. Each of these arrays are circular arrays and each is aligned with a meter dial 8 (only one shown, but a plurality contemplated) and its accompanying hand 9. The method of operation of this prior art reading device is well known and is described in the above cited patents. In practice, however, electrodes 5 and 12 are deposited on glass 6, it being thought that since the electrodes are disposed above hands 9 and spaced apart therefrom, the glass would provide a means to visually inspect and observe the physical position of hands 9, as they travel about their axis and indicate a reading on dial 8. As explained above, this creates two problems: (a) glass plate 6 plus electrodes thereon must be affixed to plastic substrate 2 by means of a conductive epoxy 10; and (b) a high impedance point is created by the glass substrate - excitable electrode composite in combination with a large resistor in the prior art receiver circuit.

Figure 16:
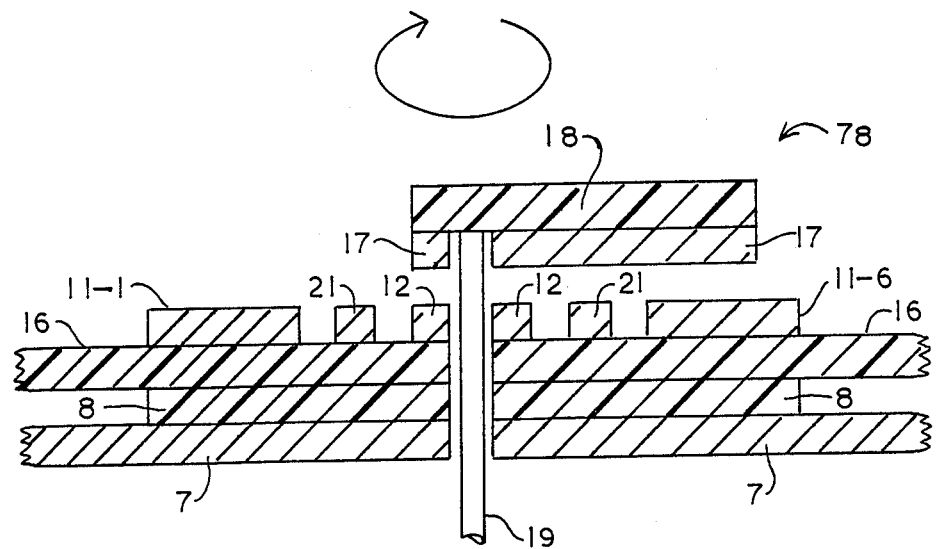
FIG. 16 is a cross sectional view showing an excitable electrode array such as that contemplated by FIG. 14, center electrode, and guard, all disposed between a dial face and a rotatable member.

It will be noted from FIG. 1 that element 1 is made up primarily of the meter backboard 7 and dial 8, with its accompanying rotatable meter hand 9 and axle 19 attached to it, in a spaced apart relationship to PCB 2 by means of clips 3. Examples of such clips are exemplified in U.S. Pat. No. 4,556,849. The present invention differs from known prior art, as shown in FIG. 1, by providing a PCB 16 containing on one surface an electrode array similar to that shown in FIGS. 7 or 14 and disposing it either with or without an electronic guard (see element 21 of FIG. 14), between dial hand 9 and dial face 8. See element 78 of FIG. 16. This does away with clips 3, glass 6 electrode 5 composite, and epoxy 10. This give rise to the possibility of being able to clean the surface of the PCB with a solvent prior to applying a coating. Dial face 8 rests or is affixed to meter back panel 7. See FIG. 16.

Figure 2:
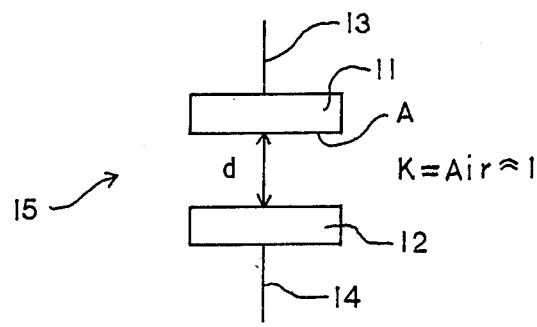
FIGS. 2, 3, 4, 5, and 6 are schematic representations of the capacitor theory of operation of the disclosed invention.

What is believed to be the theory of such operation follows. Element 15 of FIG. 2 is schematic representation of a conventional capacitor. Such is exemplified by plates 11 and 12 having area A spaced apart by a distance indicated by (d) distance, plus lead 13 to plate 11 and lead 14 to plate 12. The capacitance of such capacitor can be determined by the formula $C = K\epsilon A/d$, where C is capacitance, K is a dielectric constant, $\epsilon$ is a permittivity constant, A is the area, and d is the distance between the two plates.

Figure 3:
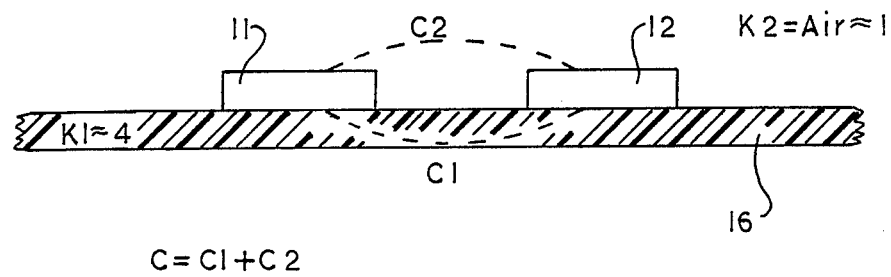

By arranging plates or electrodes 11 and 12 in a side-by-side relationship, shown in FIG. 3, the capacitance C of such an arrangement can be estimated, using a simplifying approximation, as follows: C=C1 plus C2=K1 εA1/d plus K2εA1/d. K1 is a constant, a function of the materials of the PCB 16 and K2 is a constant, a function of air.

Figure 4:
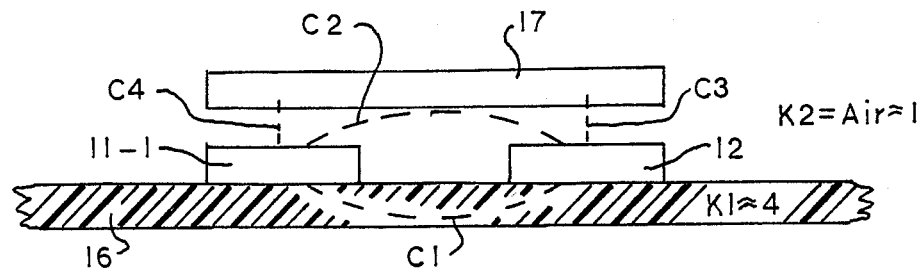

By adding to the capacitor of FIG. 3 a third plate 17 (FIG. 4), which is or can be the arm or handle of a meter dial and is disposed over plates 11 and 12 in relative close proximity as shown, a new capacitance value C' can be calculated as follows: C'=C1+C2+C3×C4/(C3+C4), where C1=K1 εA1/d1), C2=K2 (εA1/d1), C3=K2 (εA2/d2), and C4=K2 (εA3/d2). All of this implies that C' is greater than C. Thus the third plate, element 17, acts to increase the total capacitance when compared to FIG. 3.

Figure 5:
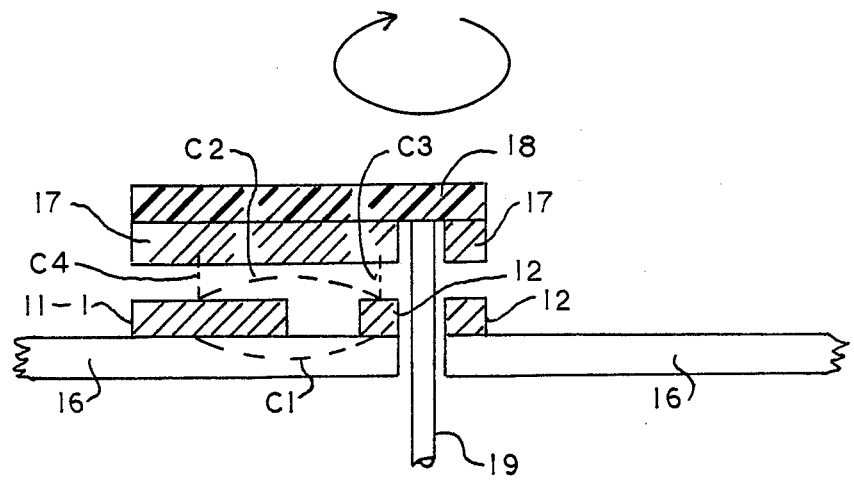
Figure 6:
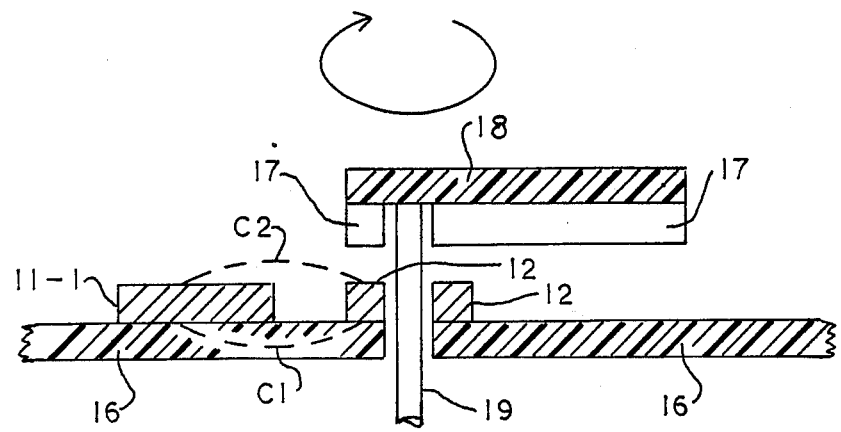

Attention is now directed to FIGS. 5 and 6. In these FIGS., axle 19 is entered through and spaced apart from plate 12 (center electrode) so that plate 17–18 (a meter hand) may be rotated in a manner to place it directly over excitable electrode 11-1. This causes a capacitance of C'. When plate 17–18 is rotated to the right as shown in FIG. 6 away from plate 11-1, the capacitance is C.

The structure of the rotatable member, a composite made of elements 17, 18, and 19, should be noted. A portion 17 of such member is conductive (a metal or metal/carbon filled plastic) and it is electrically isolated from all other elements of the apparatus.

Figure 7:
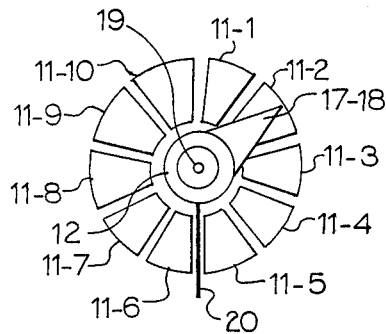
FIG. 7 is a plan view of an array of disposed electrodes, a center electrode and a rotatable meter hand and axle, the electrodes being disposed below the rotatable meter hand.
Figure 14:
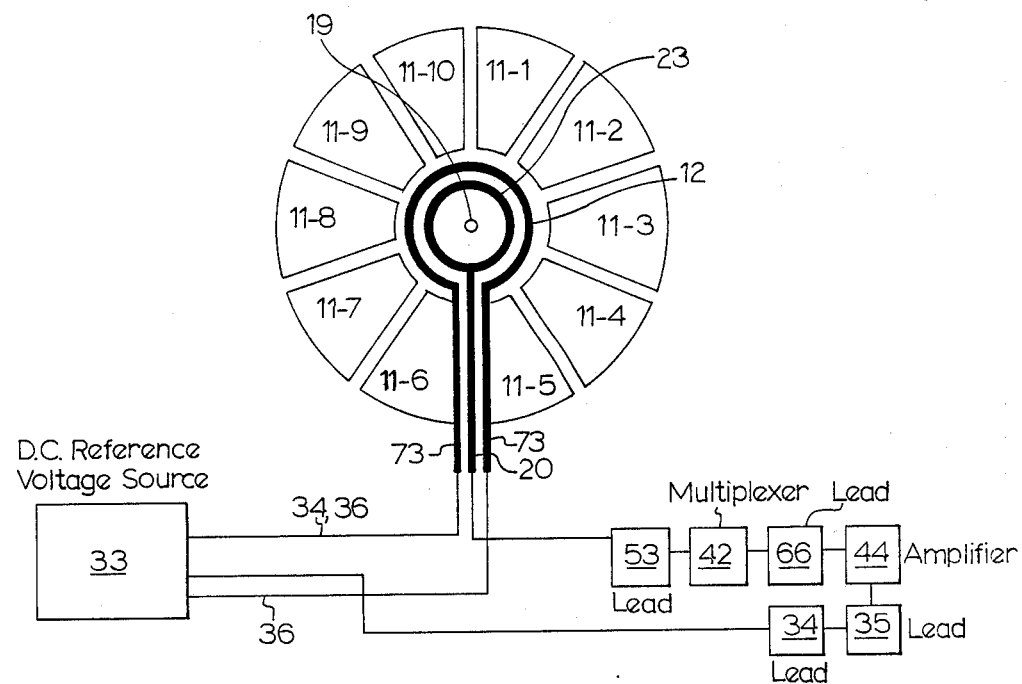
FIG. 14 is a plan view of a single electrode array of the invention including a central electrode and a guard band.
Figure 15:
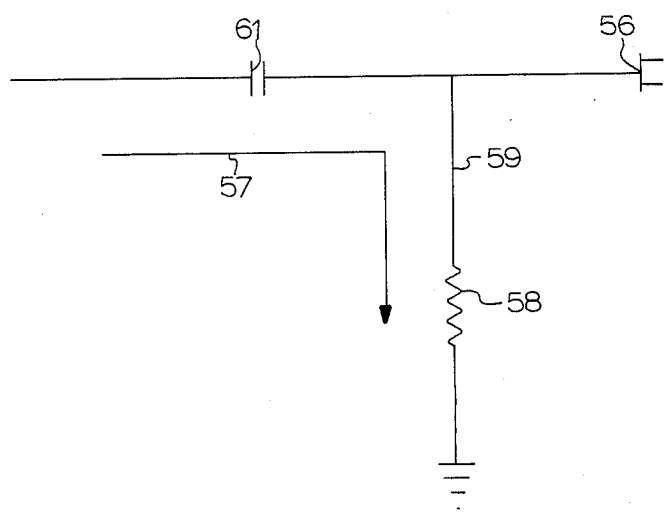
FIG. 15 is a schematic representation of prior art circuitry high impedance point.

Using the above as a model, an electrode array such as that shown in FIGS. 7 and 14 may be constructed. Such an array has an annulus shaped center electrode plate 12, disposed around and spaced apart from axle 19. To the structure of FIG. 7 there may be added guard 21, as shown in FIG. 14. Rotating member 17–18 is obviously an arm 9 of dial 8. To this construction, there is added nine more plates or electrodes 11-2 through 11-10 arranged in a circular fashion as shown. See also FIGS. 14 and 16. Such an array, with respect to center electrode 12, creates ten individual capacitors 11-1 through 11-10, each of which has a capacitance C except as increased by elements 17–18. The increase of capacitance to C' of any of the elements 11-1 through 11-10 to center electrode 12 is a function of the position of meter hand 17–18. No matter what position meter hand 17–18 has, there will be at least one capacitor (11-1 through 11-10), which will be larger than the others, i.e., where the hand is physically located. It is possible that with meter hand 17–18 centered between two adjacent plates (e.g. between 11-1 and 11-2), both capacitors 11-1 and 11-2 to center electrode 12 will be increased to exactly the same value. However, a prior art algorithm, as hereinafter more fully explained, can be used to choose one over the other as being the greater and the most significant.

Employing the configuration shown in FIG. 14, each of the ten capacitors 11-1 through 11-10 to center electrode 12 can be measured to determine their values and one can be identified as being the largest by using a comparison algorithm. The capacitor with the largest value must have the meter arm 17–18 more over it than over any other capacitor. Thus, the position of 17–18, i.e., its location, can be determined by identifying the capacitor with the largest value. To put it another way, as a voltage is applied to any one of the electrodes 11-1 through 11-10, a capacitive effect is created between the particular electrode receiving the voltage and center electrode 12. One knows the particular electrode to which the exciting voltage is applied, one also knows capacitive effect resulting therefrom because this is done for all ten electrodes 11-1 through 11-10. Consequently one can then compare each of the values determined and locate the dial hand position accordingly because it will be in closest proximity to the electrode measured with the largest capacitance. On the other hand, if electrodes 11-1 and 11-2 have the same reading, but such reading is higher than the remaining eight electrodes 11-3 through 11-10, an integrated circuit may be employed to determine the most significant, 11-1 or 11-2.

Figure 8:
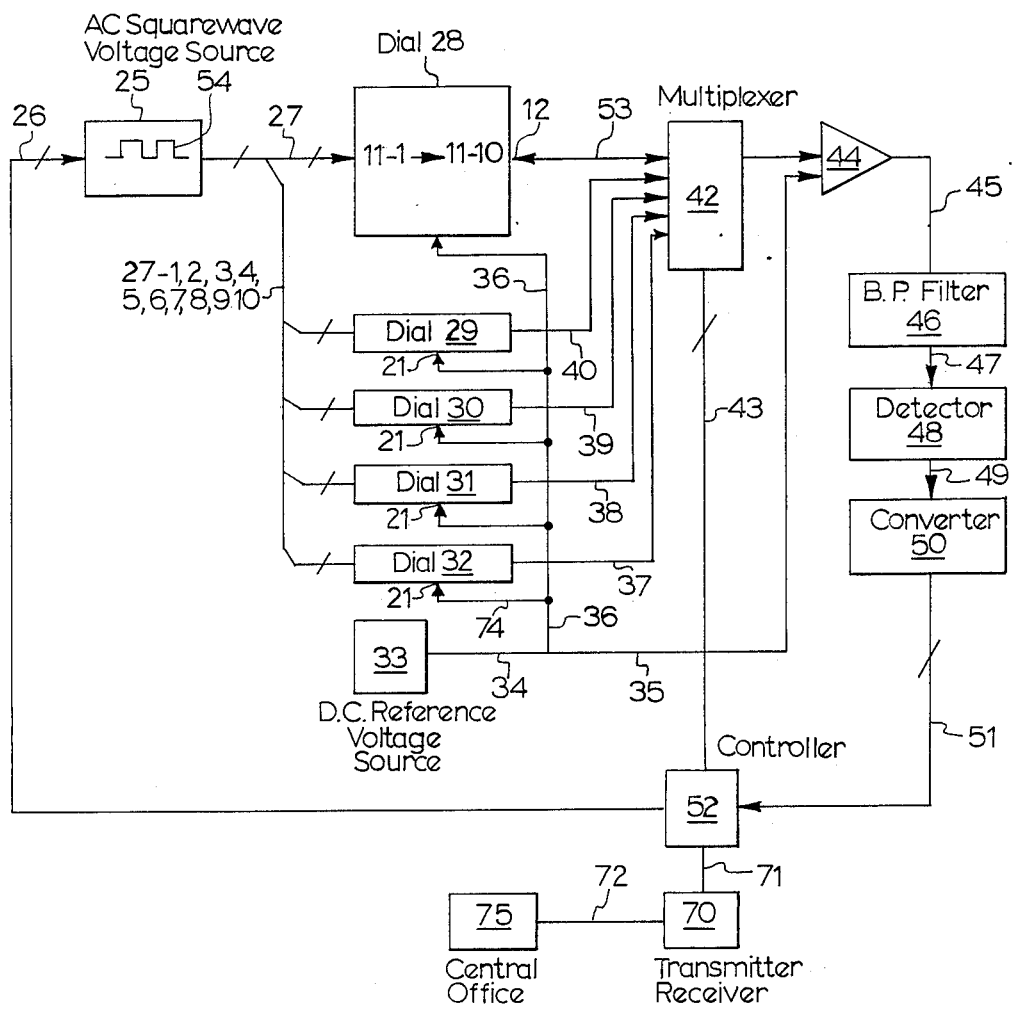
FIG. 8 is a schematic representation of a preferred circuitry employed with the instant invention.

The application of a voltage signal to any one of excitable electrodes 11-1 through 11-10 creates a current flow on center electrode 12, ultimately converted into voltage by transimpedance amplifier 44 of FIG. 8. It has been observed that when a squarewave voltage between 0 to 5 volts is applied to any given excitable electrodes 11-1 to 11-10 and when no hand is directly over the electrode to which the voltage is applied, all such like electrodes have a reading of approximately 30 mv. When hand 17–18 is present, a reading of 100 mv has been observed. In the event hand 17–18 is directly between electrodes 11-1 and 11-10, a reading of 70 mv has been observed. If excitable electrodes 11-1 and 11-2 yield the same reading, but say less than 100 mv, for example 70 mv, and all other electrodes have a reading of 30 mv, an integrated circuit controller 52 connected to the center electrode to read the capacitance values can be easily made using prior art techniques to indicate that hand 17–18 is between 11-1 and 11-2. Such a system makes the reading accurate to one In FIG. 7, the following table is applicable relative to the specific excitable electrode and the related dial arc or reading as one would encounter on an ordinary meter dial face, like that shown in FIG. 12.

| Excitable Electrode | Dial (8) ARC Or Reading |
|---|---|
| 11-1 | 0 |
| 11-2 | 1 |
| 11-3 | 2 |
| 11-4 | 3 |
| 11-5 | 4 |
| 11-6 | 5 |
| 11-7 | 6 |
| 11-8 | 7 |
| 11-9 | 8 |
| 11-10 | 9 |

Reference is now made to FIGS. 11 and 12 showing a first dial in FIG. 11 and a second dial in FIG. 12. In a typical prior art multi-dial meter (gas or electrical), the dials are disposed in a horizontal line. Reading left to right, the first dial rotates clockwise and the next dial rotates counterclockwise. This pattern is carried out for all of the dials, typically five (5) in number. For example, see a Westinghouse Model D5S. The dial of FIG. 11 is an example of the fourth dial and the dial of FIG. 12 is an example of the last or fifth dial of such five-dial meter. One complete rotation of the dial hand 9 in FIG. 12 causes the dial hand 9 of FIG. 11 to move one digit, for example zero to one. This ratiometric movement is consistent for each dial relative to the preceding (one to its immediate left) dial. In the event that the actual visual readings of the dials shown in FIGS. 11 and 12 are as shown, an integrated circuit is used to determine that since dial hand 9 of FIG. 12 is reading 9, then the dial hand 9 of FIG. 11 must be reading 0. The dial hand of FIG. 11 will read 1 only after the dial hand of FIG. 12 proceeds to 0. A conventional prior art microprocessor controller is used to make this comparison and determine the most significant digit.

Shown in FIG. 8 by element 24 is a schematic diagram of an electronic circuit used in connection with the instant invention. This schematic contemplates five dials, namely 28, 29, 30, 31, and 32. Each dial has associated with it a center electrode 12, an electrode array comprising electrodes 11-1 through 11-10 and a guard 21, spaced apart from and at least partially surrounding annulus portion 23 of center electrode 12, all disposed between hand 9 (elements 17-18) and dial 8. See FIG. 16 for example. Conductive lead 73 is integral with guard 21 and is connected by means of leads 36 and 34 to a source of D.C. reference voltage source 33, a constant bias voltage (E). A source of A.C. squarewave voltage signals 25 emitting squarewave signal 54 is connected by leads 27-1 through 27-10 to each dial and is adapted to be placed in electrical contact with any one of electrodes 11-1 to 11-10 for each of the electrode arrays in dials 28 through 32. Center electrode 12 associated with dial 28 is connected by lead 53 to multiplexer 42. Center electrode 12 associated with dial 29 is connected by lead 40 to multiplexer 42. Center electrode 12 associated with dial 30 is connected by lead 39 to multiplexer 42. Center electrode 12 associated with dial 31 is connected by lead 38 to multiplexer 42; and, center electrode 12 associated with dial 32 is connected by lead 37 to multiplexer 42. Multiplexer 42 is connected by lead 66 to a transimpedance amplifier 44, which is connected to bandpass filter 46 by lead 45. Peak-peak detector 48 is connected to bandpass filter 46 by lead 47 and analog to digital converter 50 is connected by lead 49 to peak-peak detector 48. Microprocessor or controller 52, which may be combined with A.C. voltage source 25, is connected by means of lead 51 to analog-digital converter 50 and is further connected by lead 26 to A.C. voltage signal source 25. Guard 21 in one instance is connected through elements 53, 42, 66, 44, 35, 34 to D.C. reference voltage source 33. In another instance, the connection is through elements 40, 42, 66, 44, 35, 34 to D.C. reference voltage source 33. In still another instance, the connection is through 39, 42, 66, 44, 35, 34 to D.C. reference voltage source 33. In another instance, the connection is through elements 38, 42, 66, 44, 35, 34 to element 33. In the last instance, the connection is through elements 37, 42, 66, 44, 35, 34 to element 33.

The above described circuit works as follows. A transmitter receiver (smart box) 70 is connected to microprocessor or controller 52 by means of lead 71. This smart box is further connected by lead 72 to a signal source in a central office (75), is adapted to receive a signal from a central office and to activate the controller or microprocessor 52 and control A.C. voltage signal source 25 so that any given electrode 11-1 to 11-10 of each dial may be excited on command. When hand 9, elements 17-18, is over electrode 11-1, the capacitive coupling, as previously described, is created and current then flows off of the center electrode associated with dials 28 through 32, greater than there would have been in the absence of hand 17. D.C. reference voltage source 33 supplies a steady D.C. bias voltage (E) to each guard member 21 associated with each dial by means of leads 34, 36, and 74. By means of transimpedance amplifier, voltage (E) is applied to each center electrode 12 by means of leads 20, 34, and 35, plus the virtual ground characteristic of transimpedance amplifier 44, through lead 66 back through analog multiplexer 42 and through lead 53. D.C. reference voltage source 33 supplies voltage (E) to the non-inverting input port of the transimpedance amplifier 44 via leads 34 and 35. Because of the virtual ground characteristics of element 44, the inverting input port of element 44 is held essentially at voltage (E). Thus the negative input port of element 44 is at the same voltage as the non-inverting input port. D.C. reference voltage (E) from element 33 is applied to non-inverting input port of element 44 and it thus responds by maintaining on lead 66 the same voltage potential to center electrode 12 through elements 42 and 53. The impedance characteristic of the transimpedance amplifier 44 is such that even though the positive and negative are at the same voltages, they do not share the same current. Therefore the guard 21 and center electrode 12 are at the same voltage, but they share not the same current, they are electrically buffered from one another. Guard 21 acts as insurance against signal distortion rising out of high relative humidity.

Figure 10:
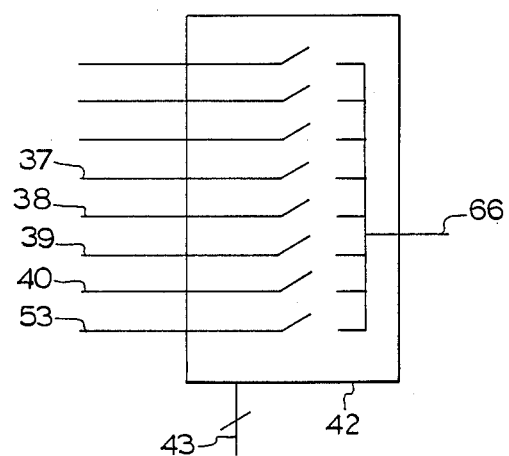
FIG. 10 is a simplified version of a multiplexer employed in the instant invention.

In the event of leakage arising out of the presence of high humidity, leakage would be expected to flow from any one of the electrodes 11-1 to 11-10, as they are excited, to center electrode 12. Since guard 21 will have the same bias voltage as center electrode 12, any such leakage would be drained off by guard 21 and disposed of in a manner well known in the art. Multiplexer 42, under the control of controller 52 via lead 43, determines which current from which central electrode of which dial is allowed to pass onto line 66. This current IX is the current created by the excited electrode. Obviously, IX is changing as the dial hand moves. A simplified schematic of multiplexer 42 is shown in FIG. 10 as a plurality of switches. Multiplexer 42 can be a 74HC4051 by Signetics, which has eight (8) incoming leads (as shown). Only five (5) of such leads are used in the disclosed best mode example.

Current IX passes onto lead 66 through transimpedance amplifier 44, which converts such current into a low voltage, EX, the voltage arising out of the capacitive coupling. E is the constant bias voltage applied to the non-inverting input port of element 44. The sum of these two voltages appear on lead 45. Band pass filter 46 is used to filter out any noise and the sum of EX+E, minus the noise, appears on lead 47. Peak-peak detector 48 strips out the voltage associated with bias voltage E and acts on voltage EX to convert it into equivalent DC voltage denoted EXPP, leaving only voltage EXPP, which is that voltage which is a function of the capacitive coupling of meter hand 9. This voltage appears at the analog to digital converter 50, which converts the analog voltage EXPP to a controller usable digital word. This digital word is read by controller 52 over lines 51 and is stored until the same process is performed for all fifty excitable electrode-center electrode pairs, ten pairs per dial and five dials. The controller then processes this information to determine the five dial hand positions (ten positions possible for each dial) for the meter as previously described. The controller 52 then transmits the "meter reading" to the "smart box" 70 via lines 71, which in turn transmits the "meter reading" to the central office 75 via lines 72.

One can use a 74HC4051 multiplexer made by Signetics, Inc., for element 42 and a TL-084 configured as a Peak-To-Peak Detector from Texas Instruments for element 48. See also Section 5.6.4 and FIG. 5-25 thereof of "IC Op-AMP Cook Book" by Walter G. Jung published by Howard W. Sams & Company, Inc., 1974. With respect to band pass filter 46, a device shown in FIG. 9 may be used.

Figure 9:
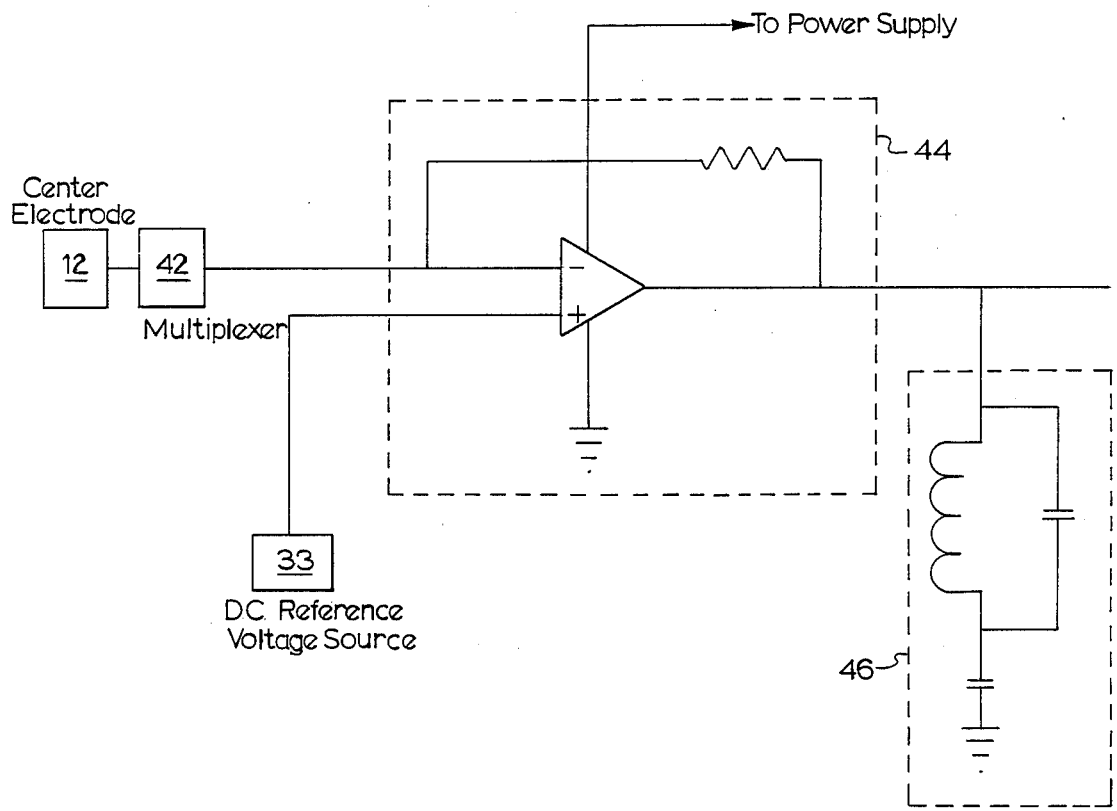
FIG. 9 is a schematic representation of a transimpedance amplifier used in the circuit of FIG. 8.

For the transimpedance amplifier 44, reference is made to FIG. 9 for an example of the elements of such a device. See also FIG. 16-5, page 573 of a publication by McGraw-Hill Book Company entitled "Microelectronics Digital and Analog Circuits and Systems" by Jacob Millman, 1979. A device identified as ADC0804 made by National Semiconductor Company may be used as an analog to digital converter 50. A device identified as MC168HC11 made by Motorola, Inc., may be used as a controller 52 and a MIU device made by Neptune Information Systems, Inc., may be used for smart box 70.

Numerous other changes and modifications could be made and the full use of equivalents resorted to, without departing from the spirit or scope of the invention.

What is claimed is:

1. In combination with an electrode array of a type in which a plurality of spaced apart excitable electrodes are deposited on one surface of a carrier plate about a center electrode, which in turn is deposited on the same surface of said carrier plate, and in which it is desired to provide a guard around said center electrode so that humidity will not substantially cause leakage from anyone of said plurality of excitable electrodes to said center electrode, the improvement comprising:
   (a) a ring shaped conducive strip deposited on said one surface of said carrier plate spaced apart from said plurality of spaced apart excitable electrodes and at least partially circumscribing said center electrode; and
   (b) another conductive strip deposited on said one surface of said carrier plate in electrical communication with, extending radially from said ring shaped conducive strip and disposed between two adjacent members of said plurality spaced apart excitable electrodes.

2. The improvement according to claim 1 further including a D.C. reference voltage potential electrically connected to said ring shaped conducive strip and to said center electrode for applying substantially the same D.C. reference voltage potential to both.

3. The improvement according to claim 2, further including an A.C. voltage signal source connected to each excitable electrode to supply a predetermined A.C. voltage signal thereto.

4. Electrode array comprising a substrate on which there is disposed:
   (a) a plurality of spaced apart excitable electrodes delimiting a center area and circumscribing an axis;
   (b) a center electrode in said center area comprising an annulus portion circumscribing and spaced apart from said axis and having another portion integral with said annulus like portion extending radially therefrom disposed between and spaced apart from two adjacent members of said plurality of spaced apart excitable electrodes; and,
   (c) a guard comprising a ring-like portion partially circumscribing and spaced apart from the annulus portion of said central electrode and further including two additional members integral with the ring-like portion extending between and spaced apart from said other portion of said central electrode and two adjacent members of said plurality of excitable electrode.

5. The electrode array as described in claim 4, further including a D.C. reference voltage potential in electrical communication with the guard and the center electrode for supplying essentially the same D.C. reference voltage to both.

6. The electrode array as described in claim 5, further including a A.C. voltage signal source connected to each excitable electrode to supply a predetermined voltage thereto.

7. An apparatus for remotely monitoring a position of a rotatable member affixed to an axle relative to a dial face spaced apart from the rotatable member as the rotatable member is rotated by said axle comprising:
   (a) a plate positioned between said rotatable member and said dial face;
   (b) an array of spaced apart excitable electrodes on one surface of said plate facing the rotatable member, surrounding the axle and defining a center portion; and,
   (c) a center electrode circumscribing said axle on said one surface of said plate in said center portion for sensing current, spaced apart from said rotatable member, said spaced apart excitable electrodes and said axle.

8. The apparatus of claim 7 further including a transmitter and receiver in communication with said central electrode, said transmitter and receiver for transmitting signals from said central electrode to a remote location.

9. The apparatus of claim 7 wherein a portion of said rotatable member has a conductive portion in confronting relationship with said spaced apart excitable electrodes, said conductive portion electrically insulated from all other elements of said apparatus.

10. Apparatus of claim 7 further including a transimpedance amplifier connected to said central electrode for converting current, received from said central electrode, into voltage.

11. The apparatus of claim 10 further including a D.C. reference voltage potential connected to said center electrode, a multiplexer, said multiplexer connected to said central electrode and to said transimpedance amplifier for governing current emitted by the center electrode arising out of voltage from said first voltage signal potential applied to a predetermined spaced apart excitable electrode.

12. The apparatus of claim 7 including a first voltage signal potential for placing a predetermined voltage signal on a predetermined one of said array of spaced apart excitable electrodes and said center electrode.

13. Apparatus of claim 12 further including a transimpedance amplifier, connected to said center electrode, a band pass filter, said band pass filter connected to said transimpedance amplifier, a peak to peak detector, said peak to peak detector connected to said band pass filter, an analog to digital converter, said analog to digital converter connected to said band pass filter and a controller, said controller connected to said digital converter and to said first voltage signal potential.

14. The apparatus of claim 12 wherein said first voltage signal potential is an A.C. voltage signal source.

15. The apparatus of claim 14 wherein said A.C. voltage signal of said first voltage signal potential is a square wave.

16. The apparatus of claim 12 further including a controller, for emitting a signal, electrically connected to said first voltage signal potential, said first voltage signal potential being responsive to said controller signal to apply an A.C. voltage signal to a predetermined one of said spaced apart excitable electrodes.

17. The apparatus of claim 16 wherein said A.C. voltage signal of said first voltage signal potential is a square wave.

18. The apparatus of claim 7 further including a guard in said center portion, at least partially circumscribing said center electrode, spaced apart from and disposed between said center electrode and said spaced apart excitable electrodes.

19. The apparatus of claim 18 wherein said guard comprises:
(i) a ring shaped conductive strip on said one surface of said plate; and
(ii) another conductive strip, in electrical communication with a said ring shaped conductive strip, extending between and spaced apart from adjacent members of said spaced apart excitable electrodes.

20. The apparatus of claim 19 further including a second voltage signal potential connected to said guard.

21. Apparatus of claim 20 further including a transimpedance amplifier connected to said center electrode and wherein said second voltage signal potential is connected to said guard and to said transimpedance amplifier.

22. The apparatus of claim 18 wherein said center electrode includes a first portion circumscribing and spaced apart from said rotatable member and a second portion extending radially therefrom deposed between and spaced apart from adjacent members of said plurality of spaced apart excitable electrodes; and, said guard comprises a ring like portion partially circumscribing and spaced apart from the first portion of said central electrode and further including two additional members integral with the guard extending between and spaced apart from said second portion of said central electrode and two adjacent members of said plurality of spaced apart excitable electrodes.

23. The apparatus as described in claim 22, further including a D.C. reference voltage potential in electrical communication with the guard and the central electrode for supplying essentially the same D.C. reference voltage to both.

24. The apparatus as described in claim 23, further including an A.C. voltage signal potential connected to anyone of the spaced apart excitable electrodes and to the center electrode to supply a predetermined voltage signal thereto.

25. An apparatus for remotely monitoring a position of a rotatable member, relative to a surface spaced apart from the rotatable member, as the rotatable member is rotated about an axis of rotation by an axle affixed to said rotatable member comprising:
(a) a substrate with an aperture therein for receiving said axle;
(b) an array of spaced apart excitable electrodes, disposed on one surface of said substrate, said array of spaced apart excitable electrodes circumscribing the aperture and delimiting a center portion; and,
(c) a center electrode on said one surface of said substrate disposed in said center portion, spaced apart from said spaced apart excitable electrodes and circumscribing said aperture.

26. The apparatus of claim 25 further including a transmitter and receiver in communication with said central electrode, said transmitter and receiver for transmitting signals from said central electrode to a remote location.

27. The apparatus of claim 25 wherein a portion of said rotatable member has a conductive portion in confronting relationship with said spaced apart excitable electrodes, said conductive portion electrically insulated from all other elements of said apparatus.

28. Apparatus of claim 25 further including a transimpedance amplifier connected to said central electrode for converting current, received from said central electrode into voltage.

29. The apparatus of claim 28, further including a DC reference voltage potential connected to said center electrode and a multiplexer, said multiplexer connected to said central electrode and to said transimpedance amplifier.

30. The apparatus of claim 25 including a first voltage signal potential for placing a predetermined voltage signal on a predetermined one of said array of spaced apart excitable electrodes and said center electrode.

31. The apparatus of claim 30 wherein said first voltage signal potential is an A.C. voltage signal source.

32. The apparatus of claim 31 wherein said A.C. voltage signal of said first voltage signal source is a square wave.

33. The apparatus of claim 30 further including a controller, for emitting a signal, electrically connected to said first voltage signal potential, said first voltage signal potential being responsive to said signal to apply an A.C. voltage signal to a predetermined one of said spaced apart excitable electrodes.

34. The apparatus of claim 33 wherein said A.C. voltage signal of said first voltage signal source is a square wave.

35. The apparatus of claim 25 further including a guard in said center portion, at least partially circumscribing said center electrode, spaced apart from and disposed between said center electrode and said spaced apart excitable electrodes.

36. The apparatus of claim 35 wherein said center electrode comprises a portion extending radially therefrom deposed between and spaced apart from adjacent members of said plurality of spaced apart excitable electrodes; and, said guard comprises a ring like portion partially circumscribing and spaced apart from said central electrode further including two additional members integral with the ring like portion of the guard extending between and spaced apart from said central electrode and two adjacent members of said plurality of spaced apart excitable electrodes.

37. The apparatus as described in claim 36, further including a D.C. reference voltage potential in electrical communication with the guard and the central electrode for supplying essentially the same D.C. reference voltage potential to both.

38. The apparatus of claim 35 wherein said guard comprises:
(i) a ring shaped conductive strip on said one surface of said substrate; and
(ii) another conductive strip, in electrical communication with said ring shaped conductive strip, extending between and spaced apart from adjacent members of said spaced apart excitable electrodes.

39. The apparatus of claim 38 further including a second voltage signal potential connected to said guard.

40. Apparatus of claim 39 further including a transimpedance amplifier connected to said center electrode and wherein said second voltage signal potential is connected to said guard and to said transimpedance amplifier.

* * * * *

UNITED STATES PATENT AND TRADEMARK OFFICE
CERTIFICATE OF CORRECTION

PATENT NO. : 4,924,407  Page 1 of 2

DATED : May 8, 1990

INVENTOR(S) : John A. King and Harley J. Staber

It is certified that error appears in the above-identified patent and that said Letters Patent is hereby corrected as shown below:

In Figure 8, in the lower right-hand corner, insert numeral 24 plus a lead line with an arrowhead on a terminal portion thereof pointing to the entire figure.

In Column 1, line 41, delete "!9" and replace with -- 19 --.

In Column 1, line 48, after the word "board" insert the Arabic numeral -- 2 --.

In Column 6, line 54, delete the word "give" and insert the word -- gives --.

In Column 7, line 13, insert a -- ( -- before the letter "K".

In Column 8, line 33 insert -- digit. -- after the word "one".

In Column 11, line 30, replace the word "conducive" with the word -- conductive --.

In Column 11, line 38, replace the word "conducive" with the word -- conductive --.

UNITED STATES PATENT AND TRADEMARK OFFICE
CERTIFICATE OF CORRECTION

PATENT NO. : 4,924,407

DATED : May 8, 1990

INVENTOR(S) : John A. King, et al

It is certified that error appears in the above-identified patent and that said Letters Patent is hereby corrected as shown below:

In column 11, line 43, replace the word "conducive" with the word --conductive--.

Signed and Sealed this

Thirty-first Day of December, 1991

Attest:

HARRY F. MANBECK, JR.

*Attesting Officer*  *Commissioner of Patents and Trademarks*